United States Patent [19]

Minagawa et al.

[11] Patent Number: 5,012,120
[45] Date of Patent: Apr. 30, 1991

[54] LOAD CONTROL SYSTEM AND METHOD FOR DISCONNECTING SUB-BUS FROM MAIN-BUS

[75] Inventors: Yoshiji Minagawa; Hiroshi Shirakawa; Hiroshi Yamazaki; Yoshiaki Ito, all of Kamakura, Japan

[73] Assignee: Mitsubishi Denki Kabushiki Kaisha, Tokyo, Japan

[21] Appl. No.: 516,581

[22] Filed: Apr. 30, 1990

Related U.S. Application Data

[62] Division of Ser. No. 94,649, Sep. 9, 1987, Pat. No. 4,963,763.

[30] Foreign Application Priority Data

Sep. 9, 1986 [JP] Japan .................. 61-212461
Sep. 12, 1986 [JP] Japan .................. 1-215450
Nov. 13, 1986 [JP] Japan .................. 61-270306

[51] Int. Cl.$^5$ .................................... H04Q 3/00
[52] U.S. Cl. ......................... 307/35; 307/40; 307/15.1; 340/825.05; 370/16; 370/17
[58] Field of Search .................. 307/34–41, 307/85.4, 85.5, 85.13, 85.14, 85.15, 53, 55, 13, 14, 15, 16, 16.1, 17

[56] References Cited

U.S. PATENT DOCUMENTS

| | | |
|---|---|---|
| 3,211,860 | 10/1965 | Stephenson, Jr. et al. . |
| 3,264,435 | 8/1966 | Klein et al. . |
| 3,296,564 | 1/1967 | Cellerini . |
| 3,569,635 | 3/1971 | Bloch .................. 370/16 X |
| 3,689,886 | 9/1972 | Durkee . |
| 4,039,757 | 8/1977 | Frisone . |
| 4,145,734 | 3/1979 | Bienvenu . |
| 4,175,238 | 11/1979 | Breimesser et al. . |
| 4,206,443 | 6/1980 | Britton . |
| 4,241,330 | 12/1980 | Hery et al. . |
| 4,276,637 | 6/1981 | LeDieu .................. 370/16 |
| 4,471,232 | 9/1984 | Peddie et al. . |
| 4,489,386 | 12/1984 | Breddan . |
| 4,506,357 | 3/1985 | Nakayashiki et al. ........ 370/16 |
| 4,540,890 | 9/1985 | Gangemi et al. . |
| 4,541,031 | 9/1985 | Ibbetson . |
| 4,568,919 | 2/1986 | Muggli et al. . |
| 4,583,088 | 4/1986 | Bux et al. . |
| 4,612,534 | 9/1986 | Buehler et al. . |
| 4,623,884 | 11/1986 | Ihara et al. ............. 370/16 X |
| 4,639,609 | 1/1987 | Floyd et al. . |
| 4,663,691 | 5/1987 | Koppl . |
| 4,665,544 | 5/1987 | Honda et al. . |
| 4,689,708 | 8/1987 | Hager et al. . |
| 4,701,630 | 10/1987 | Annunziata et al. . |
| 4,752,698 | 6/1988 | Furuyama et al. . |
| 4,769,807 | 9/1988 | Niwa et al. ............. 370/16 |
| 4,771,423 | 9/1988 | Ohya et al. ............. 370/85.15 |
| 4,779,261 | 10/1988 | Yamagishi et al. ......... 370/16 |
| 4,817,080 | 3/1989 | Soha .................. 370/17 |
| 4,899,142 | 2/1990 | Nakayashiki et al. ....... 370/16 X |

FOREIGN PATENT DOCUMENTS

| | | |
|---|---|---|
| 0064906 | 11/1982 | European Pat. Off. . |
| 0133760 | 3/1985 | European Pat. Off. . |
| 1423090 | 3/1966 | France . |
| 61-22494 | 5/1986 | Japan . |
| 2022374 | 12/1979 | United Kingdom . |

OTHER PUBLICATIONS

Edward Bruggeman et al., "A Multifunction Home Control System", 1982, IEEE International Conference on Consumer Electronics; Digest of Technical Paper, pp. 154–155.

Richard Vogt, "Improving the Reliability of Bus Systems: Fault Isolation and Fault Tolerance", *Microprocessing & Microprogramming*, vol. 1, Nos. 1–5, Aug. 1987, pp. 333–338.

*Primary Examiner*—Paul Ip
*Attorney, Agent, or Firm*—Lowe, Price, LeBlanc, Becker & Shur

[57] ABSTRACT

Load control system is for disconnecting abnormal sub-bus from main-bus; The load control system has switching circuit (50+51) for connecting the sub-bus (1A, 1B ... 1N) to the main-bus (2) or disconnecting sub-bus (1A, 1B, ... 1N) from the main-bus (2) and bus watch device (30A, 30B ... 30N) for detecting abnormal state of the sub-bus and for operating the switching circuit to disconnect the abnormal sub-bus from the main-bus (2).

4 Claims, 10 Drawing Sheets

LOAD CONTROL SYSTEM AND METHOD FOR DISCONNECTING SUB-BUS FROM MAIN-BUS

This application is a division of application Ser. No. 07/094,649 filed Sept. 9, 1987, now U.S. Pat. No. 496 3763.

PRIOR ART

FIG. 1 shows a load control system of prior art disclosed in Japanese published examined patent application SHO 61-22491. In FIG. I, a transmission bus 1 used as a signal transmission line is connected to controllers 6 as transmission devices. The controller 6 consists of relay circuit 5 and transmission bus watch device 3. The transmission bus watch device 3 consists of a transmission circuit 12, a receiving circuit 11, a transmission control circuit 13, CPU 14 and a watch dog timer 15. Input side and output side of the receiving circuit 11 and the transmission circuit 12 are connected to the transmission bus through the relay contact 5A, and output of the watch dog timer 15 is connected to the relay coil 5b.

Operation of the prior art system of FIG. 1 is described as follows. The transmission control circuit 13 converts an output of CPU 14 into a transmission format for transmission bus 1 and sends it to the transmission circuit 12. Further, the transmission control circuit 13 restores data received thereby carrying out the error control and sends it to the CPU 14.

When the data is transferred, the CPU 14 periodically outputs normal-transmission signals to the watch dog timer 15 for resetting the watch dog timer 15. Though an abnormal detection level is set in the watch dog timer 15, the abnormal detection is not carried out because the timer 15 is periodically reset. Therefore, the watch dog timer 15 energizes the relay coil 5b and thus normally closes the relay contact 5A.

When a problem occurs in either another controller, the transmission bus 1, the transmission circuit 12, the receiving circuit 11 or the transmission control circuit 13, the data transmission stops. By the stopping the data transmission, the CPU 14 stops outputting the normal-transmission signal to the watch dog timer 15. When the watch dog timer 15 does not receive the normal-transmission signal in a predetermined period, the level reaches the abnormal detection level, and hence the watch dog timer 15 stops energizing the relay coil 5b and opens the relay contact 5A. Therefore the transmission bus watch system 3 is disconnected from the transmission bus 1.

In the load control system of the prior art, the transmission bus control device is necessary for each controller and thus the system becomes expensive.

OBJECT AND SUMMARY OF THE INVENTION

It is an object of the present invention to provide simple structured load control system and method for disconnecting abnormal sub-bus thereby.

A load control system in accordance with present invention comprises:

plural sub-buses whereto at least one of the controllers is connected, a main-bus for commonly connecting the plural sub-buses, the main-bus and the plural sub-buses together constituting the bus, plural switching means provided in the plural sub-buses for connecting the each sub-bus to the main-bus or disconnecting the each sub-bus from the main bus, bus watch means for operating the switching means in a manner to disconnect the sub-bus from the main-bus when an abnormal signal is detected on the sub-bus and the main-bus, and to connect the sub-bus to the main-bus when a normal signal is detected on the sub-bus and the main-bus.

A load control system in accordance with present invention comprises:

plural sub-buses whereto at least one of the controllers is connected, a main-bus for commonly connecting the plural sub-buses, the main-bus and the plural sub-buses together constituting the bus.

main-bus watch means for watching the main-bus, comprising plural switching circuits for controlling feeding of power to the controllers connected respectively to sub-buses, and a control circuit for detecting abnormal sub-bus by opening and closing the switch circuits in a predetermined order when an abnormal signal on the main-bus is detected.

A method for disconnecting abnormal sub-bus in accordance with present invention comprises:

first step for disconnecting sub-bus from main-bus by operating a switching circuit when abnormal detection signal is issued in detecting circuit for detecting abnormal signal sent to sub-bus, second step for discriminating whether sub-bus is abnormal or not by receiving signal from controller connected to the sub-bus when the sub-bus is disconnected, third step for connecting the sub-bus to the main-bus by operating the switching circuit when the sub-bus is not abnormal, and fourth step for maintaining the switching circuit open when the sub-bus is abnormal.

A method for disconnecting abnormal sub-bus in accordance with present invention comprises, detecting step for detecting abnormal signal on main-bus by main-bus watch device, watching step for discriminating whether signal on the main-bus is normal or abnormal whenever the sub-bus is successively enabled by switching circuit, disconnecting step for disconnecting the abnormal sub-bus from the main-bus.

The system enables to selectively disconnect only abnormal sub-bus from the system by disconnecting the sub-bus from the main-bus.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

FIRST EMBODIMENT

The structure of a first embodiment of load control system in accordance with the present invention is described in detail with reference to FIG. 2.

Figure 1:
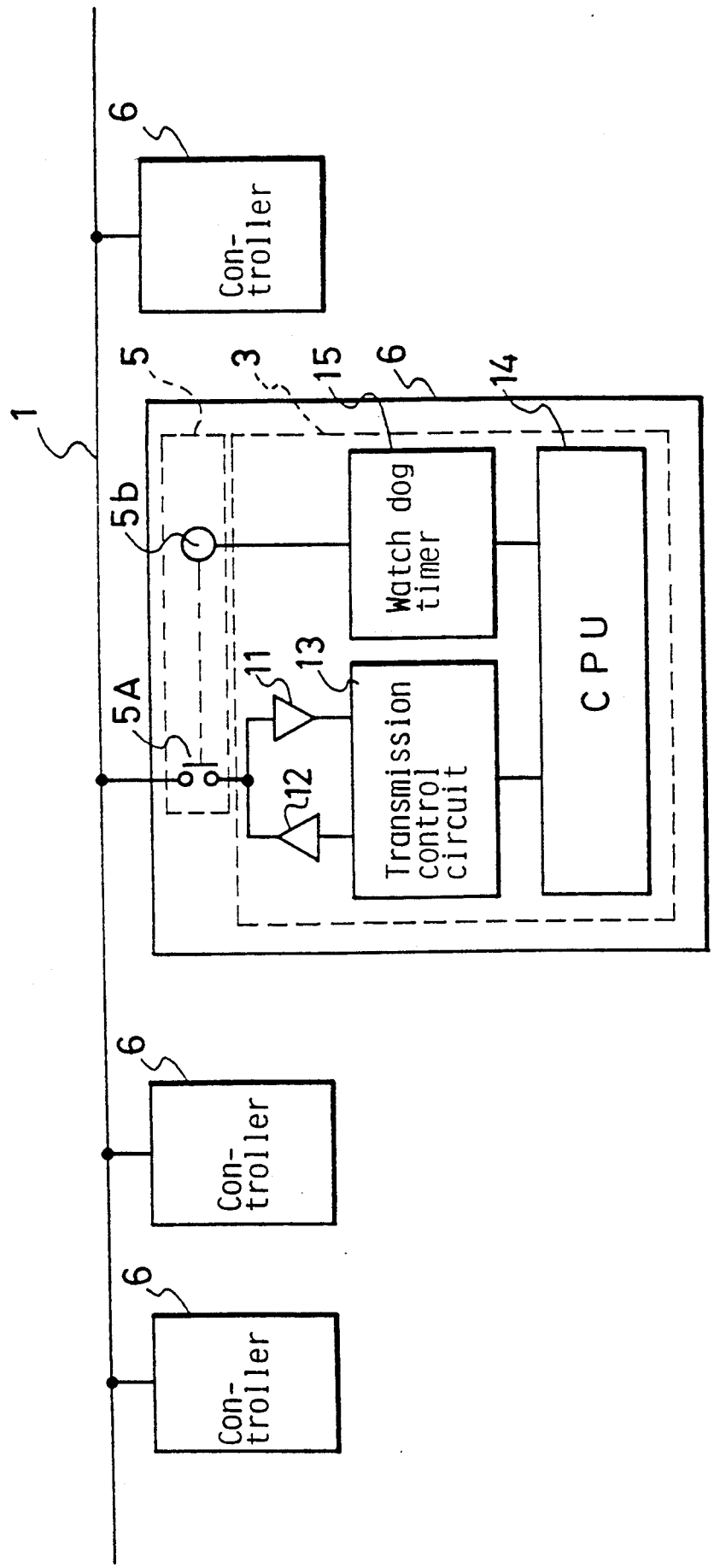
FIG. 1 is the block diagram of the load control system of prior art.
Figure 2:
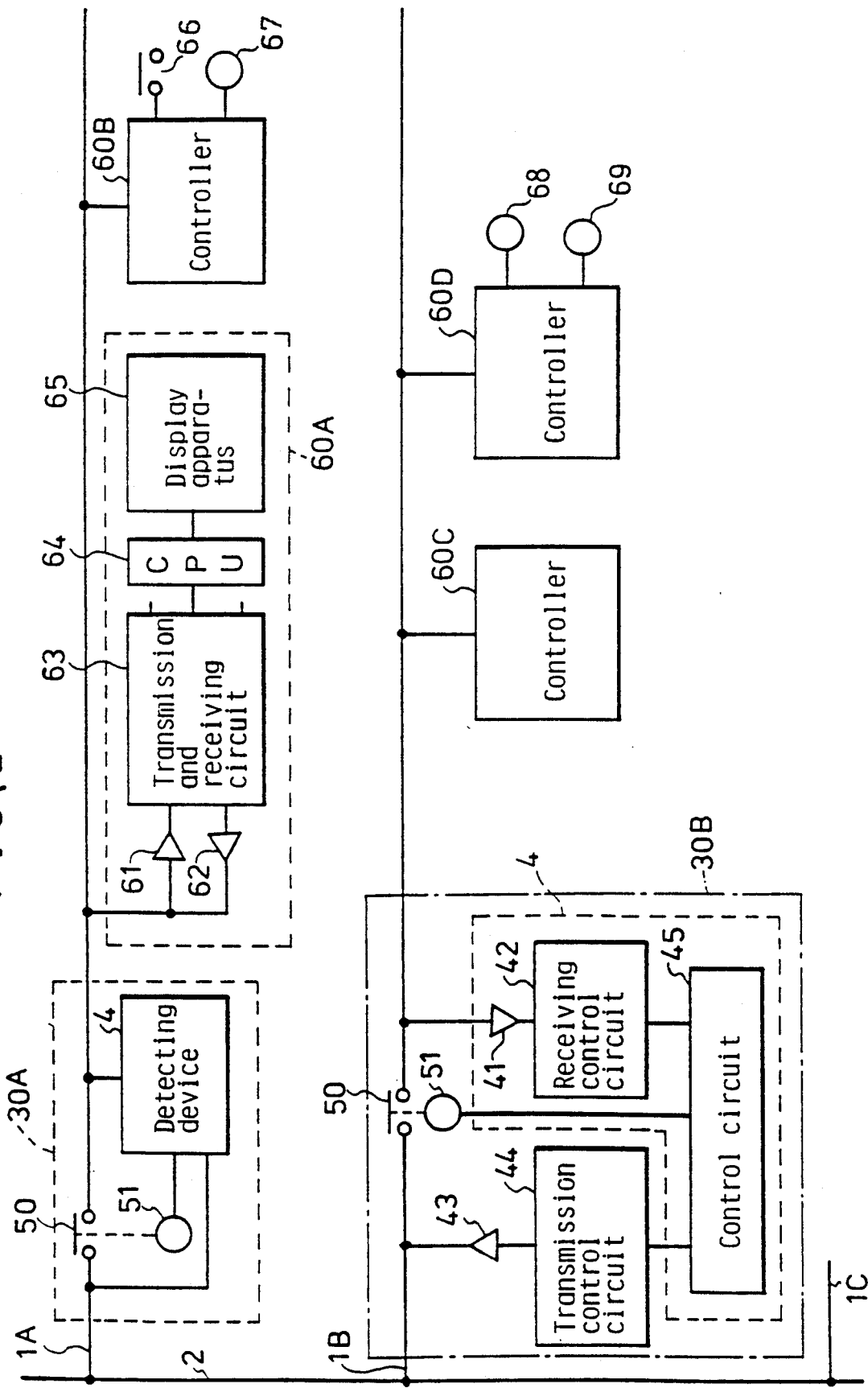
FIG. 2 is a block diagram of a load control system of a first embodiment of a present invention.

As shown in FIG. 2, sub-buses 1A, 1B and 1C are connected to a main-bus 2. In respective sub-buses 1A, 1B and 1C, a transmission line watch device 30A, 30B . . . are provided. Each transmission line watch device, for instance 30B, has a detecting device 4, a transmitting control circuit 44, a transmitting circuit 43 and a relay 51. The detecting device 4 consists of a receiving circuit 41 for receiving a signal from the sub-bus 1B, a receiving control circuit 42 for discriminating a condition of the sub-bus 1B by output signal from the receiving circuit 41 and a control circuit 45 for controlling the relay 51 corresponding to the output of the receiving control circuit 41 to open or close a contact 50 of the relay 51. The transmitting circuit 43 is connected to the sub-bus 1B at the upstream side of the contact 50 and the receiving circuit 41 of the detecting device 4 is connected to the sub-bus 1B at the downstream side than the contact 50. The transmission line watch device 30A has same structure as the transmission line watch device 30B.

Load controllers 60A, 60B, 60C and 60D are provided for controlling loads. Each controller 60A, 60B, 60C or 60D commonly has a receiving circuit 61, transmitting circuit 62, receiving and transmitting control circuit 63 and CPU 64. The controller 60A has an indicator 65, the controller 60B has a interface circuit for a sensors 66, 67, the controller 60C has a centralized control switch for loads and indicators (not shown) and the controller 60D has a interface circuit for loads 68, 69.

A sub-system is constituted by the controllers 60A, 60B, 60C and 60D connected to the sub-bus 1A and 1B. The signals from the controllers 60A—60D to the sub-buses 1A and 1B have the same protocol for achieving mutual communication between the controllers 60A and 60C.

The operation of the first embodiment of load control system in accordance with the present invention is described hereafter.

Figure 3:
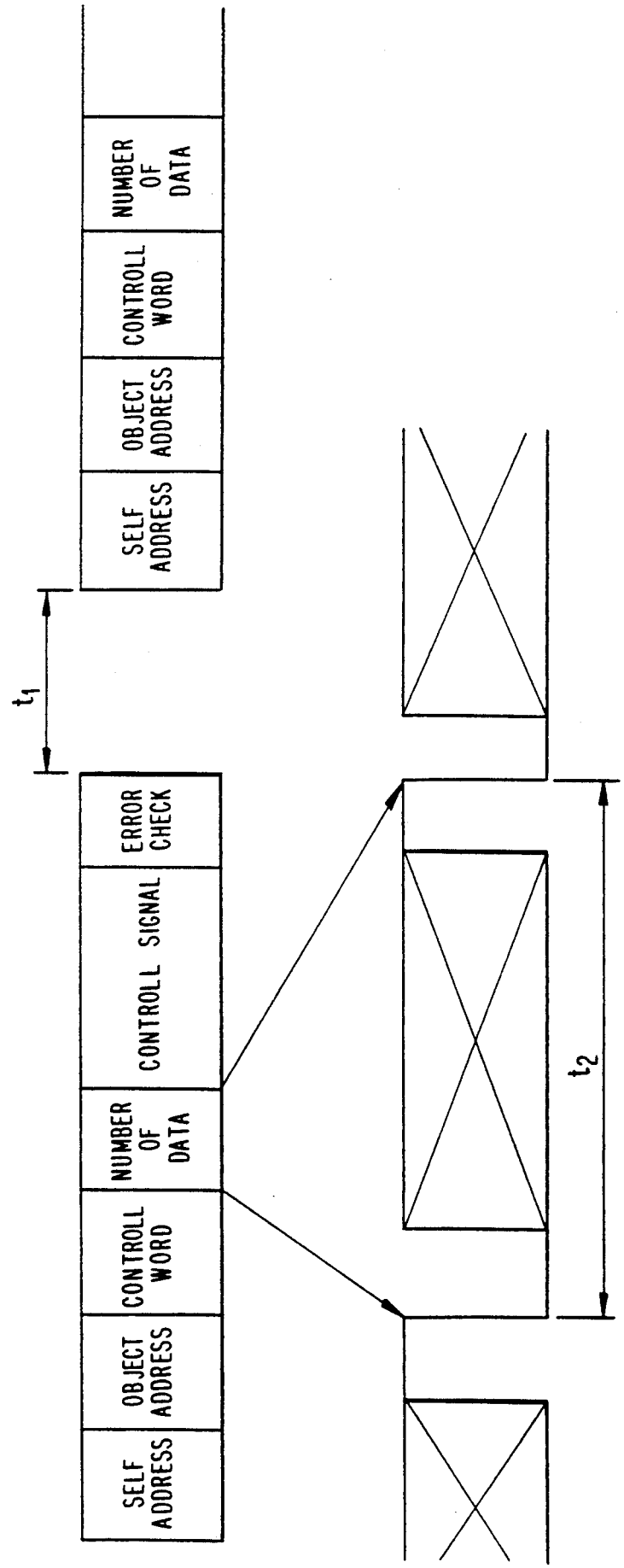
FIG. 3 shows a format for transmission data used in the load control system of FIG. 2.
Figure 4:
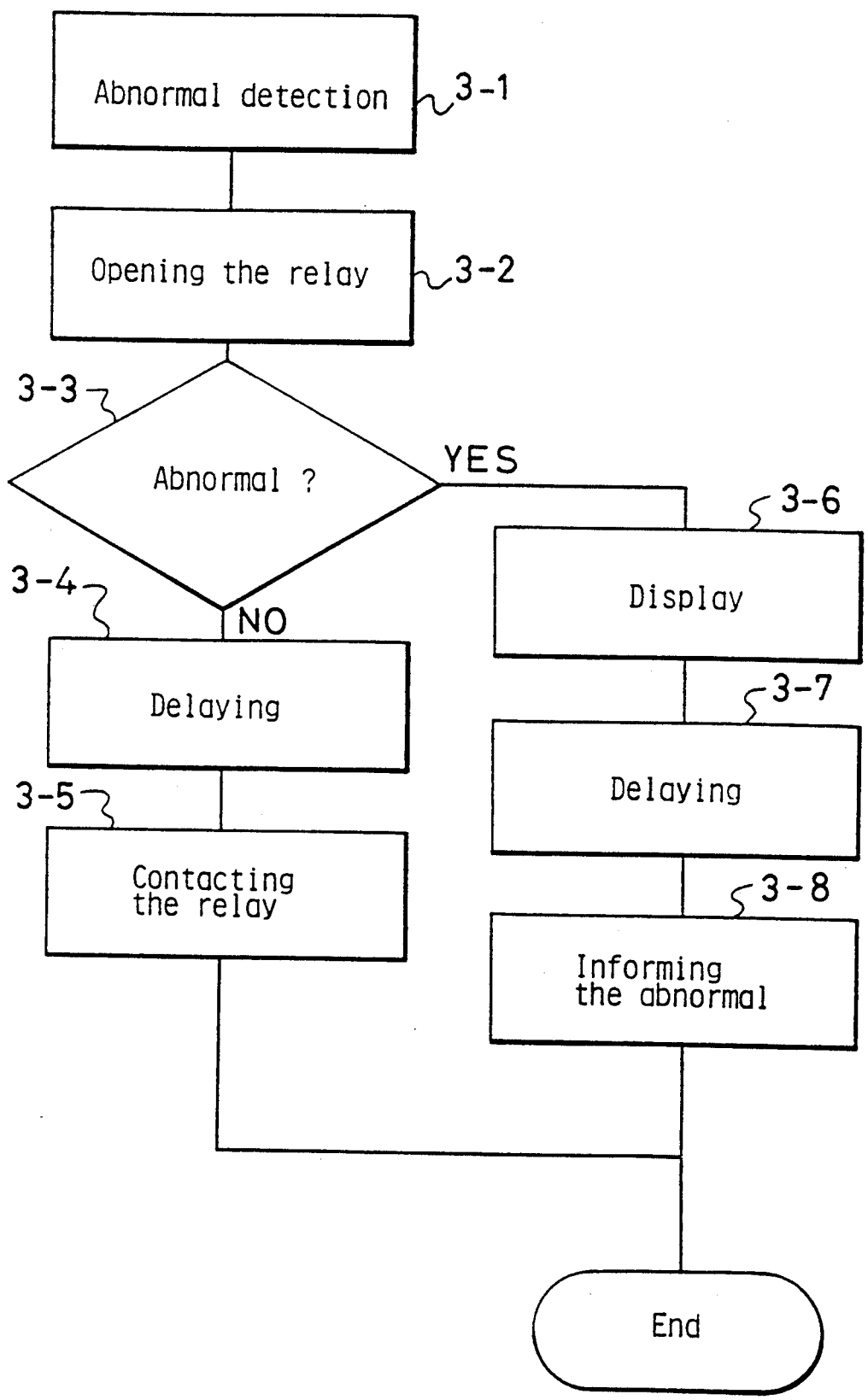
FIG. 4 is a flow chart for showing operations of the load control system.

FIG. 3 shows a packet format and bit formation of each field of control signal sent on the sub-buses 1A, 1B . . . FIG. 4 is a flow chart for showing the process when the sub-bus watch-devices 30A, 30B detect an abnormality of sub-bus.

When there is no problem such as short circuit in the sub-buses 1A, 1B and the transmission circuit 61, receiving circuit 62 and the control circuit 63 operate normally, the signals are transmitted and received normally by the packet format shown in FIG. 3. In this case, the controller 60A indicates the status of the sensors 66, 67 of the controller 60B and by operation switch of the controller 60C the loads 68, 69 connected to the controller 60D can be controlled. The receiving circuit 41 of the sub-bus watch device 30A, 30B receive the data and the control circuit 45 detects to carry out the transmission, and receiving of the data normally by the periods $t_1$, $t_2$ etc. Therefore, the control circuit 45 keeps the relay energized and the contact 50 remains closed.

When the control circuit 63 of the controller 60A malfunctions and transmits random data on the sub-bus 1A, the sub-buses 1A, 1B and 1C and the main-bus 2 are filled with the random data and thus other controllers 60B, 60C and 60D cannot transmit data. In this case, upon detection that the data received by the receiving circuit 41 of the sub-bus watch devices 30A, 30B is not corresponding with the packet format, the receiving control circuit 42 transmits the abnormal signal to the control device 45.

The control devices 30A, 30B which receive this abnormal signal start an abnormal handling process shown in FIG. 4. The control devices 30A, 30B de-energize the relay 51 at detection of abnormality and open its contact 50 (steps 3-1 and 3-2). By opening the contact 50, the sub-bus 1A can operate independently from the main-bus 2. Such operation is carried out in all sub-bus watch devices.

Because the sub-bus 1B operates independently from others, it returns to a normal state and the output of the receiving control circuit 42 becomes normal. The control device 45 detects normality or abnormality, and when conditions are normal the control device 45 connects the contact 50 after predetermined time (step 3-3, 3-4, 3-5).

The sub-bus watch device 30A connected to the sub-bus 1A operate similarly to the watch device 30B and opens the contact 50. However, the sub-bus watch device 30A keep the contact 50 open and indicates that the sub-bus 1A is abnormal and the contact 50 is opened (step 3-6). Then, after a predetermined delaying time (step 3-7), the control device 45 transfers to the transmission control circuit 44 the data for showing that the sub-bus 1A is abnormal.

The transmission control circuit 44 drives the transmission circuit 43 to transmit the data with predetermined format shown in FIG. 3. The controllers connected to the sub-buses 1B, 1C receive the data and indicate the abnormality of the sub-bus 1A if necessary (step 3-8). When fixing the delaying time, the contact 50 of sub-bus 1B is closed. As mentioned above, shutdown of an system caused by the abnormality is prevented by selectively disconnecting the abnormal sub-bus 1A and connecting only the normal sub-bus 1B.

Also in case of a short circuit of the sub-bus 1A or 1B or substantial short circuit caused by trouble with an element of the transmission circuit 61 or the receiving circuit 62, the system can carry out the operation above.

Second Embodiment

The structure of a second embodiment of load control system in accordance with the present invention is described in detail with reference to FIG. 5.

Figure 5:
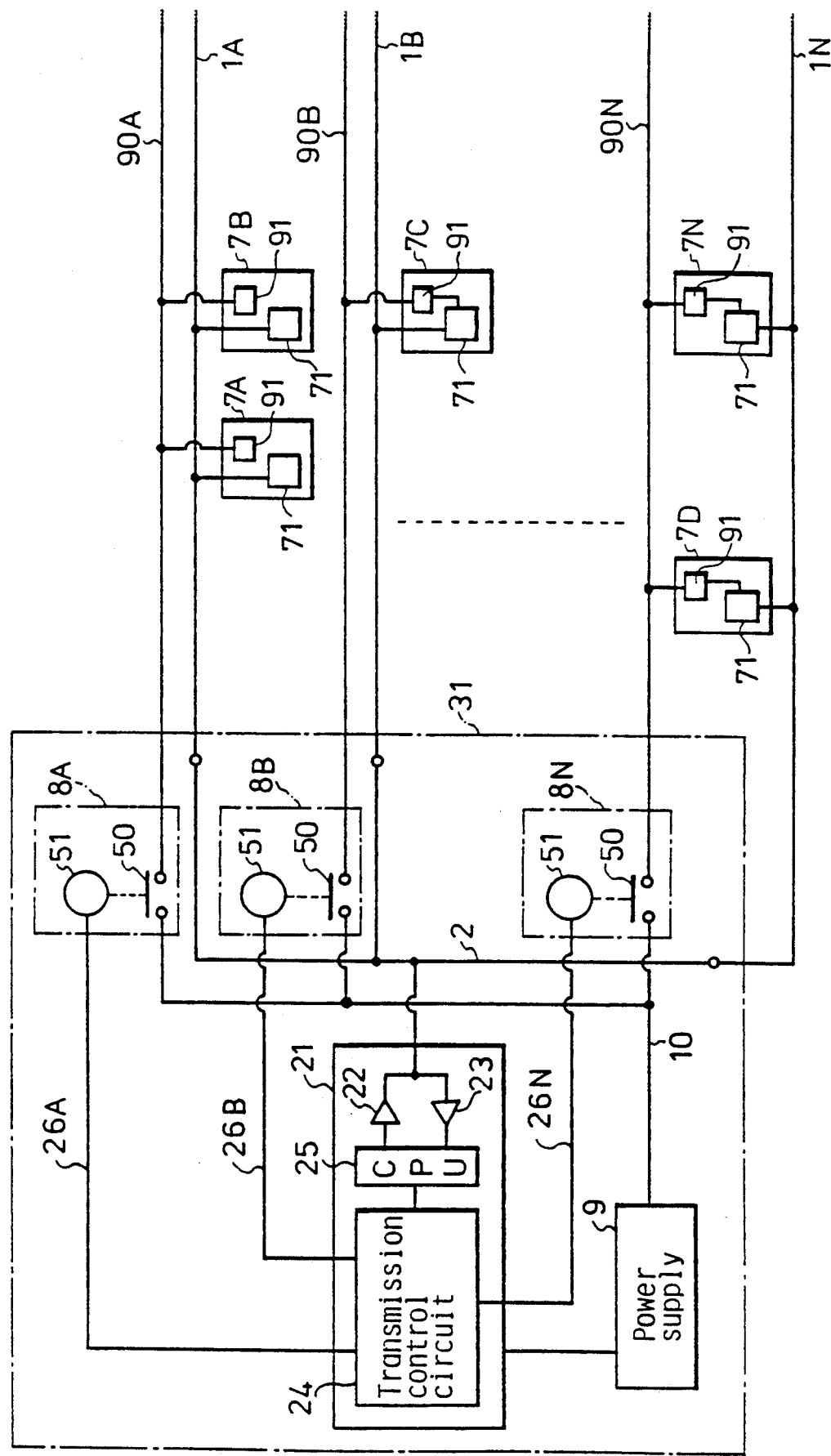
FIG. 5 is a block diagram of a load control system of a second embodiment of the present invention.

As shown in FIG. 5, a main-bus watch device 31 has a main-bus watch control circuit 21, switch circuits 8A, 8B, . . . 8N provided for the sub-buses 1A, 1B . . . 1N and a power supply circuit 9. Power supplying lines 90A, 90B . . . 90N are provided for the sub-buses 1A, 1B . . . 1N. Power supplying lines 90A, 90B . . . 90N are connected to the power supply circuit 9 through respective switch circuits 8A, 8B . . . 8N. The controllers 7A, 7B, 7C, 7D . . . 7N connected to the sub-bus 1A, 1B . . . 1N are fed with the power through the power supplying lines 90A, 90B . . . 90N, respectively.

The switch circuits 8A, 8B . . . 8N consist of the relay contact 50 and relay coil 51. The watch control circuit 21 consists of a transmission circuit 22, a receiving circuit 23, a transmission control circuit 24 and CPU 25. Each relay contacts 50 is controlled by the watch control circuit 21 through respective control lines 26A, 26B . . . 26N.

In each controller 7A, 7B . . . 7N, a power receiving circuit 91 is connected to respective power supplying lines 90A, 90B . . . 90N and feeds the power to the sub-bus watch control circuit 71.

Each sub-bus constitutes a sub-system, for example, a control system for a security device or a control system for a display device. Transmission systems of control signal of these sub-systems have the same protocol with each other.

The operations of the second embodiment of the load control system in accordance with the present invention is described as follows. When the data transmission is carried out normally in all sub-buses 1A, 1B . . . 1N connected to the main-bus 2, the main-bus watch control circuit 21 energizes the relay coil 51 through the control lines 26A, 26B . . . 26N to normally close the relay contact 50. Therefore, the controllers 7A, 7B . . . 7N connected to the sub-bus 1A, 1B . . . 1N can be fed with the power through the power supplying lines 90A, 90B . . . 90N and each other so that communication through the main-bus 2 becomes possible.

When the controllers 7A, 7B . . . 7N connected to the sub-buses 1A, 1B . . . 1N or the sub-buses 1A, 1B . . . 1N having problems, the main-bus watch control circuit 21 detects the abnormal state on the main-bus 2 through abnormal signal(s) not having the predetermined protocol.

(When the Abnormal state occur)

Figure 6:
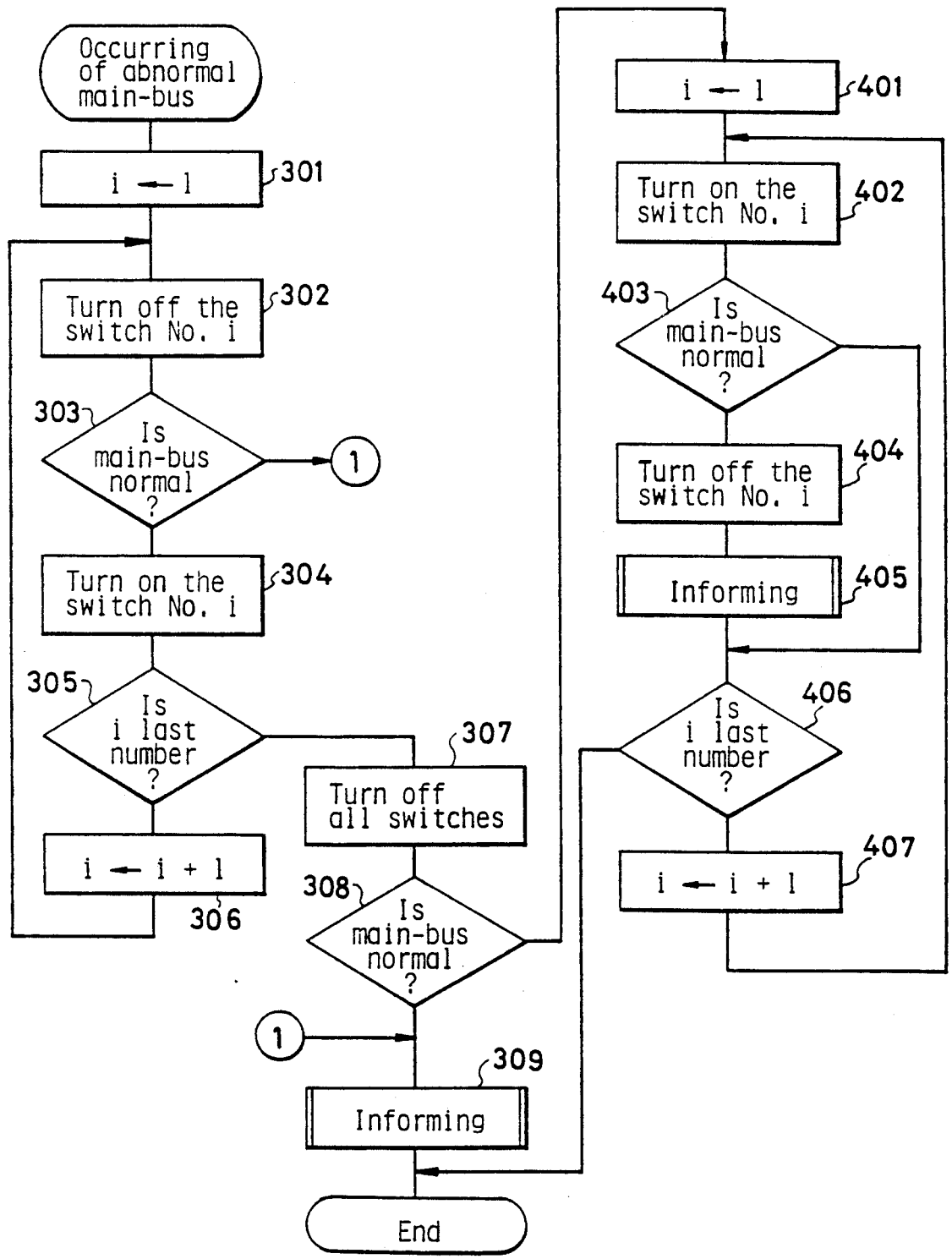
FIG. 6 is a flow chart for showing operations of the load control system of FIG. 5.

When the abnormal state as shown of the main-bus 2 is detected, the main-bus watch control circuit 21 detects the sub-bus which causes the abnormal state by the flow chart shown in FIG. 6. The main-bus watch control circuit 21 then operates the transmission control circuit 24 corresponding to the output of CPU 25, thereby successively stopping the energization of relay coils 51, hence to successively open the relay contact 50. The main-bus watch control circuit 21 watches the main-bus 2 whenever the relay contact 50 is opened.

When the relay contact 50 opens, the controllers 7A, 7B . . . 7N connected to the sub-buses 1A, 1B . . . 1N can not receive the power from the power supplying lines 90A, 90B . . . 90N and thus all operations stop.

The main-bus watch control circuit 21 energizes the relay coil 51 and closes the relay contact 50, when the abnormal state is detected again on the main-bus 2. The main-bus watch control circuit 21 starts to feed the power through the power supplying lines 90A, 90B . . . 90N to the controller 7A, 7B . . . 7N connected to the sub-buses 1A, 1B . . . 1N. Therefore, the controllers 7A, 7B . . . 7N can carry out the operation and can restore the process by resetting the internal circuits of the controllers 7A, 7B . . . 7N.

When the abnormal state of the main-bus is not detected again, the main-bus watch control circuit 21 keeps the relay coil 51 in non-energized state thereby opening the relay contact 50, and cause the CPU 25 to issue an abnormal signal. The abnormal signal actuates the transmission circuit 22 to indicate an occurrence of the abnormal state on the sub-buses 1A, 1B . . . 1N to the controller 7A, 7B . . . 7N on the sub-buses 1A, 1B . . . 1N; or alternatively, the abnormal signal may make the main-bus watch device 31 to detect the abnormal sub-bus (steps 301 to 306 and 309).

When there are more than one abnormal sub-buses or the main-bus is abnormal, the abnormal bus can not be specified in the above-mentioned method. In this case, the main bus watch control circuit 21 operates the transmission control circuit 24 by output of CPU 25 so that all the relay coils 51 are disenergized and all the relay contacts 50 are opened. Therefore, the controllers 7A, 7B . . . 7N connected to the sub-buses 1A, 1B . . . 1N cannot receive the power from the power supplying lines 90A, 90B . . . 90N and stop the all operations. As mentioned above, the main-bus watch control circuit 21 watches the main-bus 2 in a condition where all relay contacts are open (steps 307, 308).

When the abnormal state of the main-bus 2 is detected again, the main-bus watch control circuit 21 keeps all relay contacts 50 open and signals the abnormality on the main-bus 2 to the main-bus watch control device 31 by output of CPU 25 (step 309).

When the abnormal state of the main-bus 2 is not detected, the main-bus watch control circuit 21 successively energizes the relay coils 51 for successively closing the relay contacts 50 to feed the power to the controllers 7A, 7B . . . 7N from the power supplying lines 90A, 90B . . . 90N. Therefore, the controllers 7A, 7B . . . 7N can carry out the operations again and the process can be restored by resetting the internal circuit of the controllers 7A, 7B . . . 7N. The main-bus watch control circuit 21 successively watches the main-bus 2 whenever each relay contacts 50 closes. When the abnormality is not detected, the relay contact 50 is kept closed. When the abnormality is detected, the relay contact 50 is opened again for stopping the power to the controllers connected to the abnormal sub-bus.

After opening the relay contact 50, the main-bus watch control circuit 21 indicates the abnormal sub-bus by informing the abnormal state on the sub-buses 1A, 1B . . . 1N to the controller 7A, 7B . . . 7N on the sub-buses from the CPU 25 through the transmission circuit 22 or to the main-bus watch device 31 from the CPU 25 (steps 401 to 407).

In other embodiments, the controllers 7A, 7B . . . 7N or the main-bus watch system 31 which receive this information indicate the information.

Even when there is no abnormal state, by stopping the power to some controllers 7A, 7B . . . 7N energy saving is achieved.

In still other embodiments, after a predetermined time from stopping to supply of power to the abnormal sub-bus the main-bus watch control circuit 21 again supplies the power and watches the main-bus 2. When the abnormal state is not detected, the main-bus watch control circucit 21 maintains the supply of power. When the abnormal state is detected, the main-bus watch control circuit 21 stops the supply of power. Then, this operation is repeated in predetermined time period. In this embodiment, a sub-system which becomes normally operable can be returned into the whole system.

In still another embodiment, the control signal can be piled up on the power supplying line. In this case, when the power supply circuit 9 is provided for each of sub-buses 1A, 1B . . . 1N, the sub-system is operable independently or the main-bus system by disconnecting the sub-bus from the main-bus 2.

Figure 7:
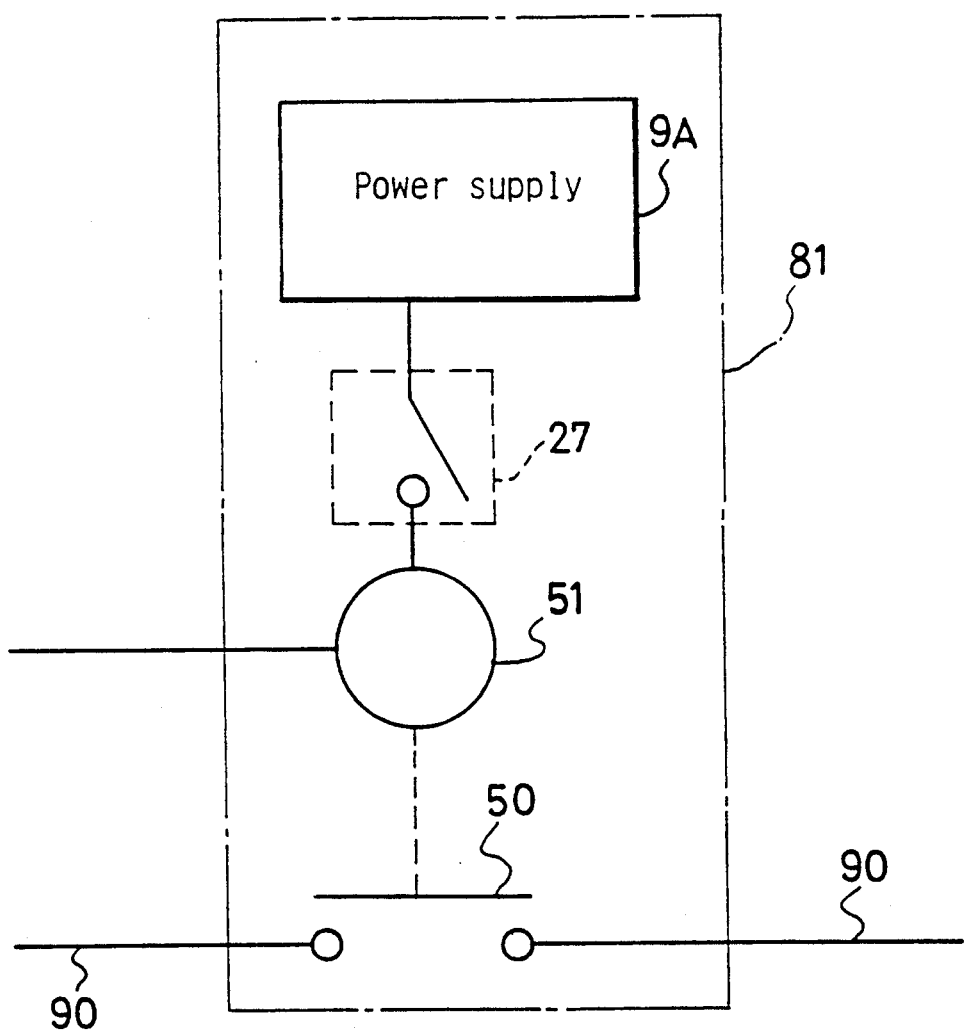
FIG. 7 is a block diagram for showing other example of a switch circuit for the load control system of FIG. 5.

FIG. 7 shows a block diagram of another switch circuit 81 for the load control system of FIG. 5. The switch circuit 81 has a power source 9A and a manual switch 27 as manual switching means. It is possible to stop supplying power to the devices connected to specified sub-bus without influencing the controllers connected to other sub-buses, and further, it is possible to supply the power again to the controllers connected to the abnormal sub-bus.

As has been described above, it is not necessary to provide the sub-bus watch control circuit in the controllers 7A, 7B ... 7N. Therefore, the simplified system is obtainable.

Third Embodiment

The structure of a third embodiment of load control system in accordance with the present invention is described in detail with reference to FIG. 8 as follows.

Figure 8:
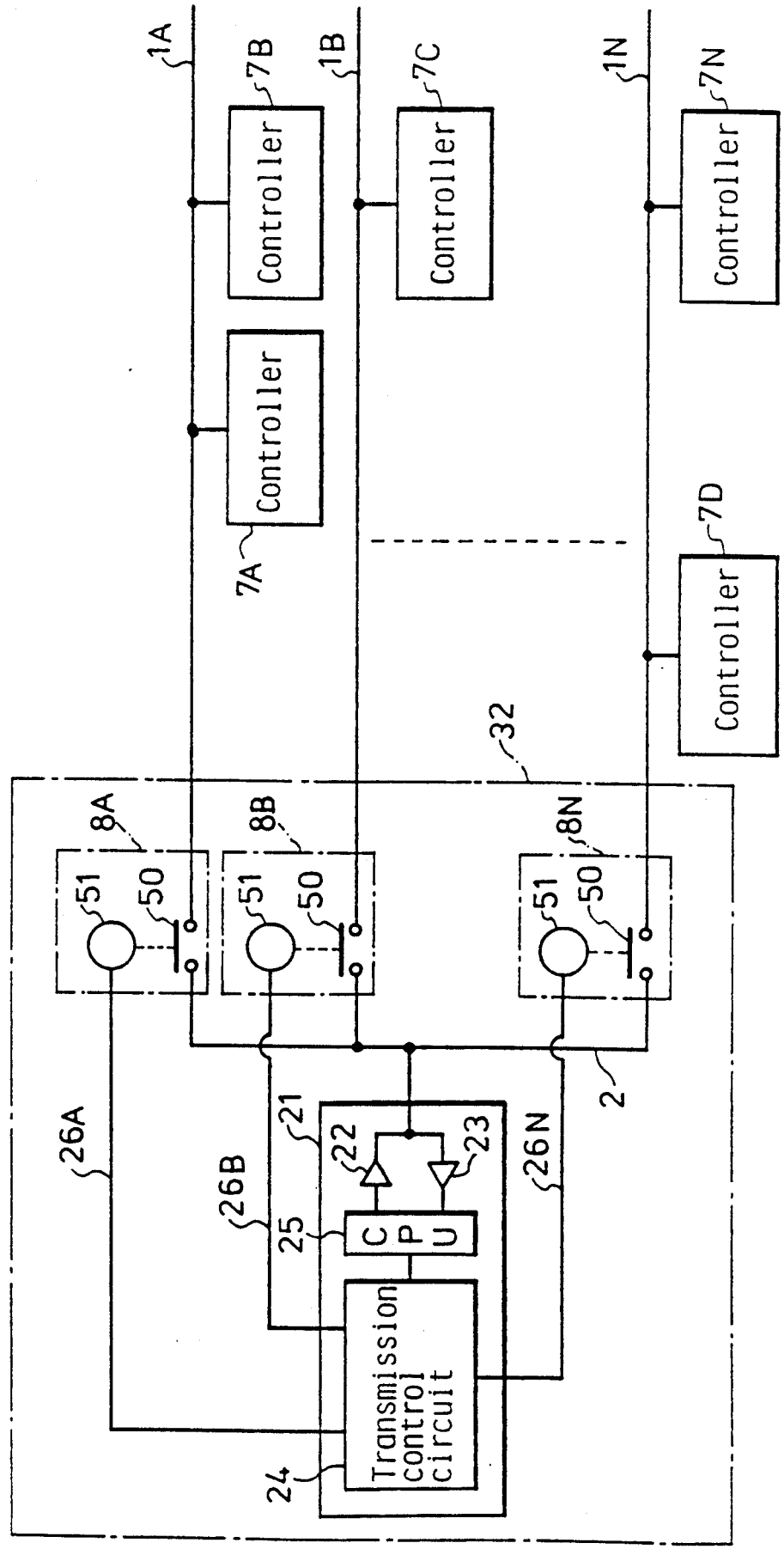
FIG. 8 is a block diagram of a load control system of a third embodiment of the present invention.

As shown in FIG. 8, sub-buses 1A, 1B ... 1N are connected to the main-bus 2. A main-bus watch device 32 has a main-bus watch control device 21 and switch circuits 8A, 8B ... 8N for connecting or disconnecting the sub-buses 1A, 1B ... 1N to and from the main-bus 2. The main-bus watch control device 21 and the sub-buses 1A, 1B ... 1N are connected through control lines 26A, 26B ... 26N. The main-bus watch control circuit 21 consists of a transmission circuit 22, a receiving circuit 23, a transmission control circuit 24 and a CPU 25. The switch circuits 8A, 8B ... 8N consist of a relay contact 50 and a relay coil 51.

Each sub-bus constitutes the sub-system, for example, a control system for a security device or a control system for a display device. All transmission systems of control signal of these sub-systems have the same protocol.

The operation of the third embodiment of load control system in accordance with the present invention is described as follows. When the data transmission is carried out normally in all sub-buses 1A, 1B ... 1N connected to the main-bus 2, the main-bus watch control circuit 21 energizes the relay coil 51 through the control lines 26A, 26B ... 26N to close the relay contact 50. Therefore, the controllers 7A, 7B ... 7N connected to the sub-bus 1A, 1B ... 1N can communicate with each other.

When the controllers 7A, 7B ... 7N connected to the sub-buses 1A, 1B ... 1N or the sub-buses 1A, 1B ... 1N are in trouble, the main-bus watch control circuit 21 detects the abnormal state on the main-bus 2 by an abnormal signal that does not have predetermined protocol.

Figure 9:
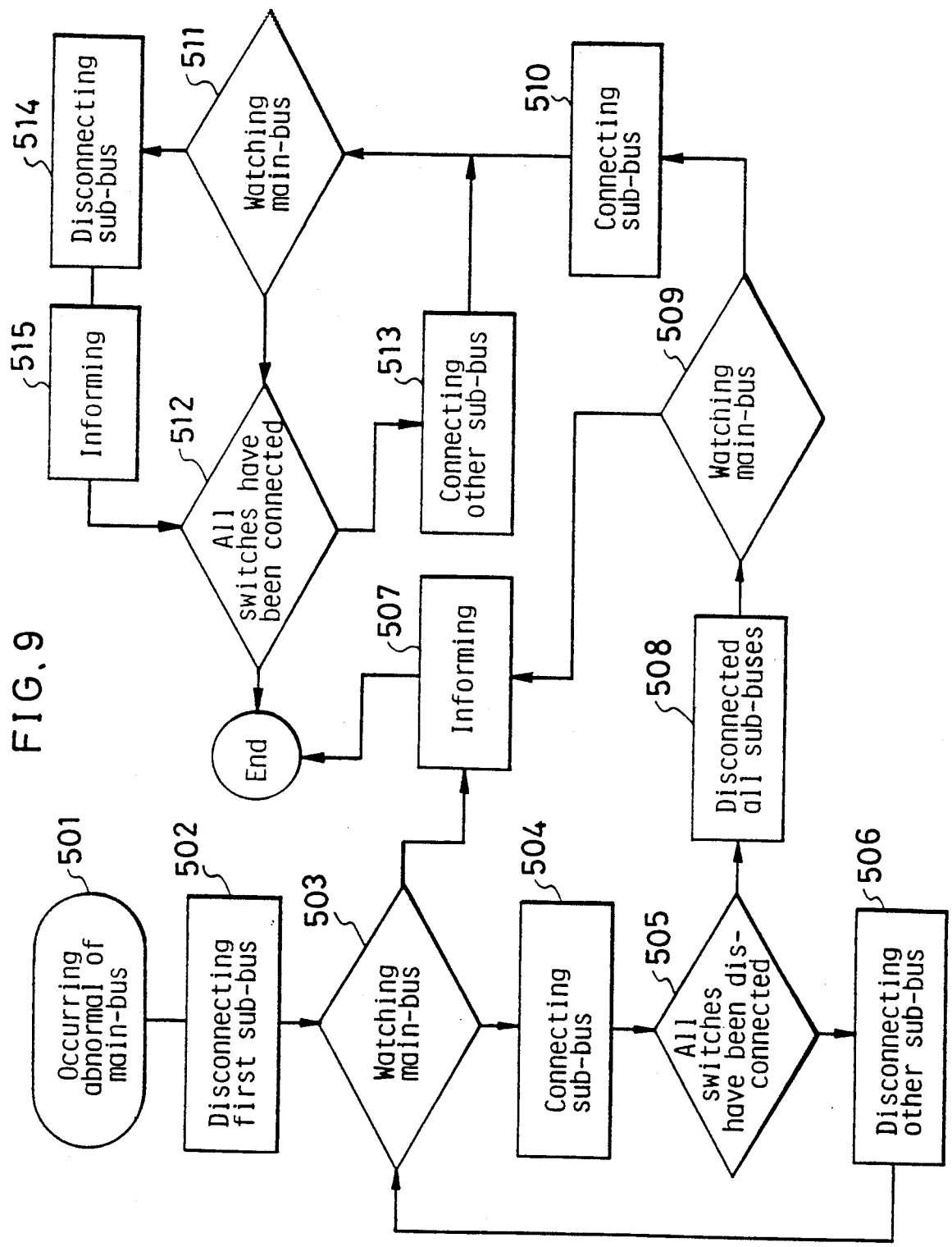
FIG. 9 is a flow chart for showing operations of the load control system of FIG. 8.

When the abnormal state of the main-bus 2 is detected, the main-bus watch control circuit 21 detects the sub-bus which causes the abnormal state according to the steps of flow chart shown in FIG. 9. The main-bus watch control circuit 21 operates the transmission control circuit 24 corresponding to the output of CPU 25, thereby successively stopping the energization of relay coil 51 to successively open the relay contact 50. The main-bus watch control circuit 21 watches the main-bus 2 whenever the relay contact 50 is opened.

The main-bus watch control circuit 21 energizes the relay coil 51 and closes the relay contact 50, when the abnormal state is detected again on the main-bus 2. When the abnormal state of the main-bus is not detected any more, the main-bus watch control circuit 21 keeps the relay coil 51 in a non-energized state, thereby opening the relay contact 50 and indicating the abnormal sub-bus by signalling the abnormal state on the sub-buses 1A, 1B ... 1N from the CPU 25 through the transmission circuit 22 or to the main-bus watch device 31 from the CPU 25 (steps 501 to 507).

When more than one abnormal sub-buses or the main-bus is abnormal, the abnormal bus cannot be specified in the above-mentioned method. In this case, the main-bus watch control circuit 21 operates the transmission control circuit 24 by output of CPU 25 thereby de-energizing all relay coils 51 and opening all relay contacts 50. Therefore, the main-bus watch control circuit 21 watches the main-bus 2 under the condition that the all relay contacts are open (steps 508, 509).

When the abnormal state of the main-bus is detected, the main-bus watch control circuit 21 keeps all relay contacts 50 open and signals the abnormality on the main-bus 2 to the main-bus watch control device 31 by output of CPU 25 (step 507).

When the abnormal state of the main-bus 2 is not detected, the main-bus watch control circuit 21 successively energizes the relay coils 51, thereby successively closing the relay contacts 50 to successively connect the sub-buses 1A, 1B ... 1N to the main-bus 2. The main-bus watch control circuit 21 successively watches the main-bus 2 whenever each of the sub-buses is connected to the main-bus 2 (steps 510 to 513). When the abnormality is not detected, the sub-bus remains connected the main-bus. When the abnormality is detected, the relay contact 50 is opened again thereby disconnecting the abnormal sub-bus from the main-bus. Then the main-bus watch control circuit 21 indicates the abnormal sub-bus by reception of information of the abnormal state on the sub-buses 1A, 1B ... 1N to the controllers 7A, 7B ... 7N on the sub-buses from the CPU 25 through the transmission circuit 22, or alternatively the main-bus watch device 32 makes the main-bus watch device 31 to detect the abnormal sub-bus, responding to the signal from the CPU 25 (steps 514, 515).

In other embodiments, the controllers 7A, 7B ... 7N or the main-bus watch system 31 received this information indicates the information.

Even when there is no abnormal state, by disconnecting some sub-buses from the main-bus control by utilizing the main-bus control circuit 21, a sub-system that is operable independently from the main-bus system can be obtained.

Figure 10:
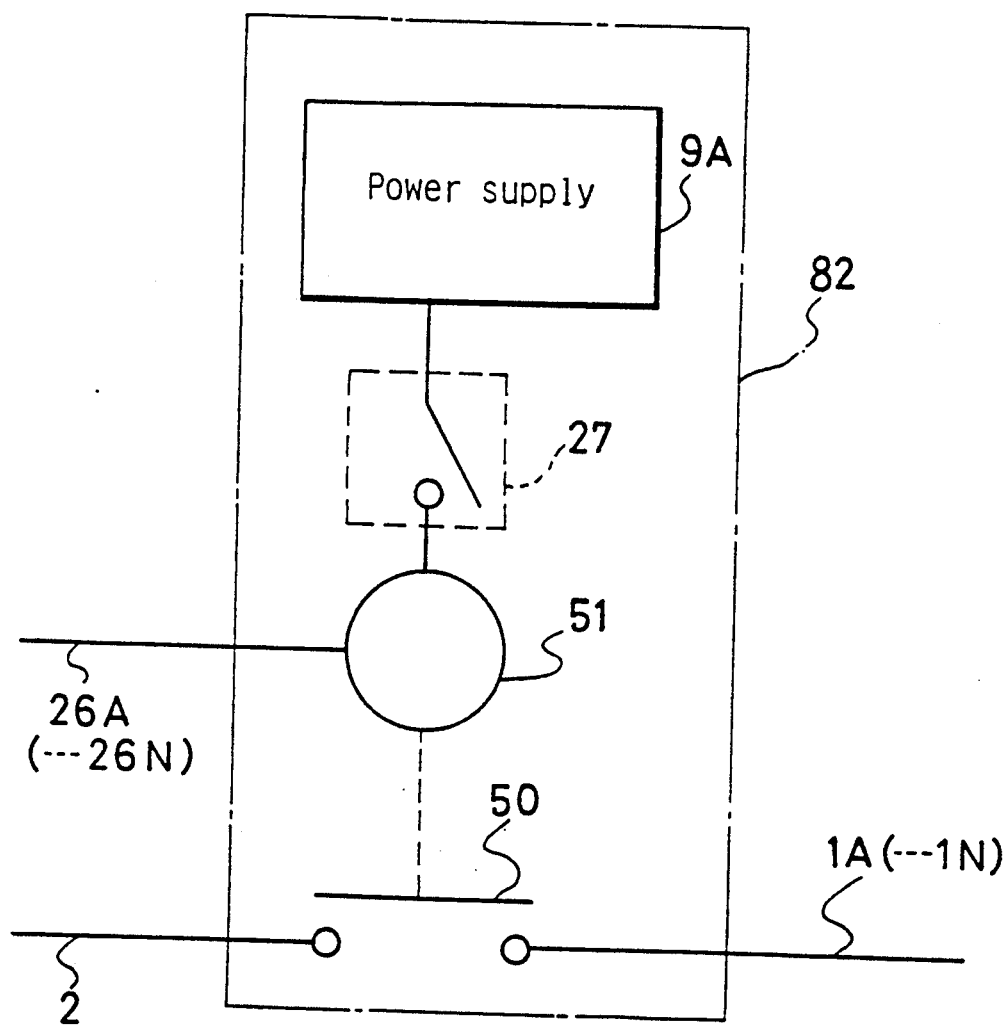
FIG. 10 is a block diagram for showing another example of a switch circuit for the load control system of FIG. 8.

FIG. 10 shows a block diagram of other switch circuit 82 for the load control system of FIG. 8. The switch circuit 81 has a power source 9A and a manual switch 27 as manual switching means. It is possible to a specified sub-bus without influence of the controllers connected to other sub-buses, and it is possible to connect the abnormal sub-bus.

As has been described in detail for various embodiments according to the present invention, it is not necessary to provide the transmission watch device in each controller. Therefore, a simplified system is obtained.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A method for detecting and disconnecting an abnormal sub-bus from a main-bus in a data network system comprising:

disconnecting a sub-bus from the main-bus by operating a switching circuit when an abnormal detection signal is issued in a detecting circuit for detecting an abnormal signal sent to the sub-bus, discriminating whether the sub-bus is abnormal or not by receiving a signal from a controller connected to the sub-bus when the sub-bus is disconnected, connecting the sub-bus to the main-bus by operating the switching circuit when the sub-bus is not abnormal, and maintaining the switching circuit open when the sub-bus is abnormal.

2. A method for substantially disconnecting an abnormal sub-bus from a main-bus in a data network system comprising the steps of:

detecting an abnormal signal on the main-bus by a main-bus watch device;

connecting said sub-buses to said main-bus in a predetermined sequence with a switching circuit in response to the detection of said abnormal signal;

discriminating whether a signal on the main-bus is normal or abnormal when said sub-buses are connecting to said main-bus in said predetermined pattern;

identifying an abnormal sub-bus based on the determination that said signal is abnormal; and disconnecting the abnormal sub-bus from said main-bus.

3. A method for substantially disconnecting an abnormal sub-bus from a main-bus in accordance with claim 2, wherein:

said predetermined sequence includes connecting all of said sub-buses to said main-bus and successively disconnecting each of said sub-buses from the main-bus.

4. A method for substantially disconnecting abnormal sub-bus from main-bus in accordance with claim 2, wherein:

said predetermined sequence includes disconnecting all of said sub-buses from said main-bus and successively connecting each of said sub-buses to the main-bus.

* * * * *

UNITED STATES PATENT AND TRADEMARK OFFICE
CERTIFICATE OF CORRECTION

PATENT NO. : 5,012,120
DATED : April 30, 1991
INVENTOR(S) : Yoshiji MINAGAWA et al.

It is certified that error appears in the above-identified patent and that said Letters Patent is hereby corrected as shown below: On the title page, Item[30]

Please change the second Foreign Application Priority Data as follows:

Sep. 12, 1986 [JP]   Japan ............ 61-215450

Signed and Sealed this

Twenty-fourth Day of August, 1993

Attest:

Attesting Officer

BRUCE LEHMAN

Commissioner of Patents and Trademarks